May 18, 1943     D. J. CIERI     2,319,297
EMERGENCY BRAKE FOR VEHICLES
Filed Oct. 13, 1941
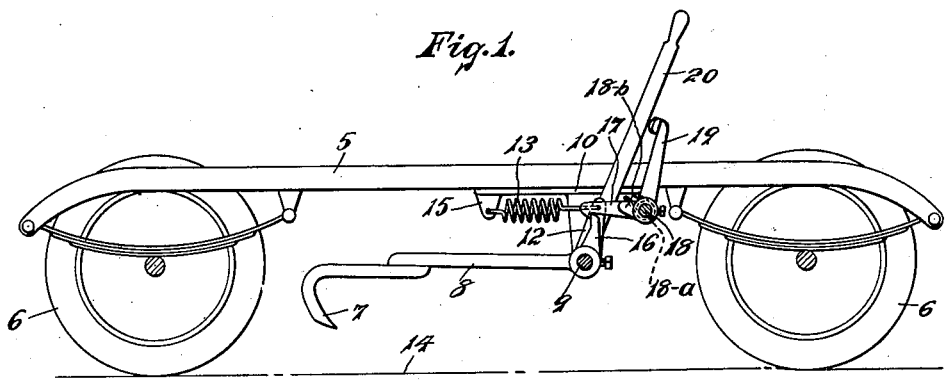
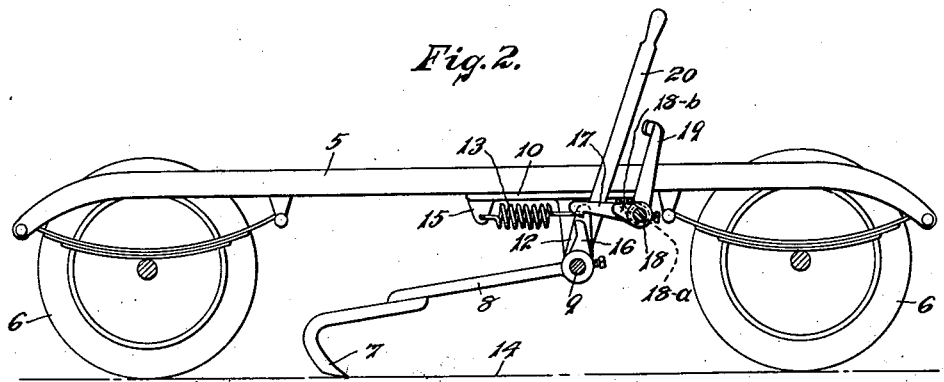
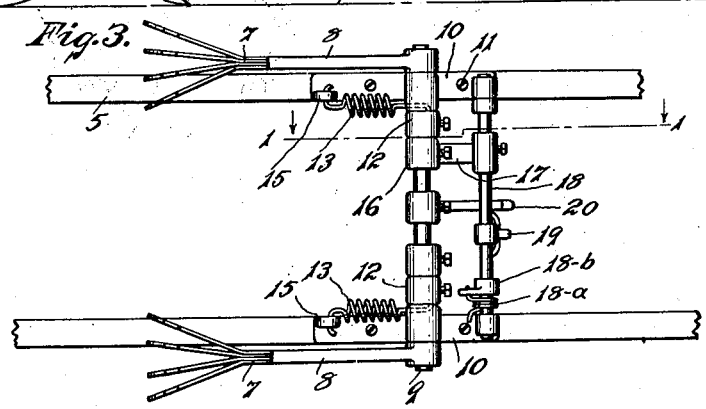
INVENTOR.
Dominick J. Cieri.
BY *Louis V. Lucia*
ATTORNEY.

Patented May 18, 1943

2,319,297

UNITED STATES PATENT OFFICE 2,319,297

EMERGENCY BRAKE FOR VEHICLES

Dominick J. Cieri, Hartford, Conn.

Application October 13, 1941, Serial No. 414,725

8 Claims. (Cl. 188—5)

This invention relates to emergency brakes for vehicles and particularly to such brakes as are adapted to contact with the road for preventing skidding.

An object of this invention is to provide a brake which is normally held out of engagement with the road surface against a spring tension and which may be quickly released to cause said tension to move a claw-shaped member into engagement with the road surface.

A further object of the invention is to provide means for manually supplementing the spring tension to move said claw member into more forceful engagement with said surface.

A still further object of this invention is to provide a device for such an emergency brake which is practically self-contained and thereby adapted to be applied to a motor vehicle by attaching the same onto the frame of the vehicle in a complete unit as an accessory.

Further objects and advantages of the invention will be more clearly understood from the following description and from the accompanying drawing in which:

Fig. 1 is a side view, in central vertical section, on line 1—1 of Fig. 3, of an emergency brake comprising my invention and showing the same attached to the frame of a motor vehicle.

Fig. 2 is a similar view showing the brake in operative position.

Fig. 3 is a bottom view thereof.

As illustrated in the drawing, the numeral 5 denotes the frame of a vehicle having the wheels 6—6.

The brake mechanism comprising my invention preferably includes claw or hook-shaped members 7—7 secured to bars 8—8 which are pivoted to a shaft 9. The said shaft is rotatably mounted in brackets 10—10 which may be secured to the members 5—5 of the motor vehicle frame by means of the screws 11.

The shaft 9 is provided with rocker arms 12—12 which are connected with springs 13—13 for urging rotation of the shaft and the hook members 7—7 towards the surface of the road indicated at 14.

The said springs are connected to the extensions 15—15 that preferably depend from the brackets 10—10.

The shaft 9 is provided with a dog 16 that is adapted to be engaged by a pawl 17 on a rocker shaft 18 which is urged counterclockwise by a spring 18-a against an arm 18-b and has secured thereto a pedal lever 19 that extends upwardly through the floor of the vehicle, not shown.

A hand lever 20 is connected to the shaft 9 for rocking said shaft to move the members 7—7 into more forceful engagement with the road surface 14 when desired.

The operation of my improved emergency brake is as follows. When it is desired to render the brake mechanism operable, the operator of the vehicle places his foot on the pedal 19 and forces it forwardly against the tension of the spring 18-a. This rocks the shaft 18 and causes the pawl 17 to move upwardly out of engagement with the dog 16. The springs 13—13 will then pull upon the arms 12—12 and rock the bars 8—8 downwardly, moving the hooks 7—7 into engagement with the road surface. If it is found necessary to further urge the said hooks 7—7 so as to cause them to more forcefully engage the road surface, the operator may pull on the lever 20 thus manually applying a pull upon said hook in the direction to the road surface, in addition to the tension applied thereon by the springs 13—13.

After the vehicle has come to a stop and it is desirable to disengage the hooks 7—7 from the road surface, the lever 20 may be pushed forwardly thus rocking the shaft 9 in the opposite direction, causing the hook 7 to be lifted away from the road and the dog 16 to slide under the pawl 17 and engage said pawl to retain the brake mechanism in its normal inoperative position as shown in Fig. 1.

I claim:

1. For a vehicle, an emergency brake mechanism including a rocker shaft, a road-gripping member carried by said shaft for engaging the road, means for urging rotation of said shaft to force said member into engagement with the road, a dog on said shaft, a pawl for engaging said dog to retain said member out of engagement with the road, and means for operating said pawl to cause it to disengage said dog and permit said member to be brought into contact with the road.

2. For a vehicle, an emergency brake mechanism including a rocker shaft, a road-gripping member carried by said shaft for engaging the surface of the road, means for urging rotation of said shaft to urge said member into engagement with the road, a dog on said shaft, and a pawl for engaging said dog to retain said member out of engagement with the road.

3. For a vehicle, an emergency brake mechanism including a rocker shaft, a road-gripping member carried by said shaft for engaging the road, means for urging rotation of said shaft to move said member into engagement with the road, a dog on said shaft, a pawl for engaging said dog to retain said member out of engagement with the road, means for operating said pawl to cause it to disengage said dog and permit said member to be brought into contact with the road, and separate means for rocking said shaft to controllably urge said member into engagement with the road.

4. For a vehicle, an emergency brake mechanism including a rocker shaft, road-gripping members carried by said shaft, spring means for urging said members into contact with the road, means for normally retaining said members out of engagement with the road against the tension of said spring means and adapted to release said members to cause them to be brought into contact with the road by said spring means, and manually operable means on said shaft for controllably operating said members relative to said road surface and returning them to their normal position.

5. For a vehicle, an emergency brake device comprising a claw-shaped member pivotally mounted to said vehicle, spring means for urging said claw-shaped member in the direction of the road surface for engagement therewith, foot-operable means for normally retaining said members out of engagement with the road against the tension of said spring means, and manually operable means for controlling the operation of said members relative to their engagement with the road surface and returning them to their normal position.

6. For a vehicle, an emergency brake mechanism comprising a plurality of claw-shaped members movably mounted on said vehicle and adapted to engage with the road, springs means urging said members in the direction of the road, releasable means for normally retaining said members out of engagement with the road, and separate controllable means for urging said members into engagement with said surface.

7. For a vehicle, an emergency brake mechanism entirely contained on a pair of brackets adapted to be mounted to the frame of the vehicle and including a rocker shaft, a pair of road-gripping members mounted on said shaft, spring means urging said members in the direction of the road, foot-operable means for normally retaining said members out of engagement with the road against the tension of said spring means, and separate controllable means adapted to rock said shaft for controllably urging said members into engagement with the road and moving them to their normal position.

8. For a vehicle, an emergency brake mechanism entirely contained on a pair of brackets adapted to be mounted to the frame of the vehicle and including a rotatable shaft, hook-shaped members on said shaft, spring means for urging said members into contact with the surface of the road, a dog on said shaft, a separate rotatable shaft, a pawl on said separate shaft for engaging said dog to retain said hook-shaped members out of engagement with the road against the tension of said spring means, a foot-operated member on said separate shaft for rotating the same to cause said pawl to release the dog and permit movement of the members by said spring means, a spring urging said pawl into engagement with said dog and a separate manually operable member secured to the first mentioned shaft for controllably urging said hook-shaped members into engagement with the road surface and returning them to their normal position and said dog into engagement with said pawl.

DOMINICK J. CIERI.